United States Patent [19]

Branigin et al.

[11] 4,419,724

[45] Dec. 6, 1983

[54] MAIN BUS INTERFACE PACKAGE

[75] Inventors: Michael H. Branigin, Penllyn; Edward G. Sherbert, Plymouth Meeting; Joseph F. Krasucki, Jr., Downingtown, all of Pa.

[73] Assignee: Sperry Corporation, New York, N.Y.

[21] Appl. No.: 140,285

[22] Filed: Apr. 14, 1980

[51] Int. Cl.³ .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,348,210 | 10/1967 | Ochsner | 364/200 |
| 3,462,744 | 8/1969 | Tomasulo et al. | 364/200 |
| 3,735,365 | 5/1973 | Nakamura et al. | 364/200 |
| 3,919,693 | 11/1975 | Anderson | 364/200 |
| 3,984,819 | 10/1976 | Anderson | 364/200 |
| 3,993,981 | 11/1976 | Cassarino, Jr. et al. | 364/200 |
| 3,995,258 | 11/1976 | Barlow | 364/200 |
| 3,997,896 | 12/1976 | Cassarino, Jr. | 364/200 |
| 4,001,790 | 11/1977 | Barlow | 364/200 |
| 4,038,644 | 7/1977 | Duke et al. | 364/900 |
| 4,065,809 | 12/1977 | Matsumoto | 364/200 |

OTHER PUBLICATIONS

Ansi Tec. Committee X3T9 Minicomputer Project 54, "USA Contribution to ISO TC97/SC13 for a Small Computer-to-Peripheral Bus Interface Standard, Dec. 12, 1978.

*Primary Examiner*—Raulfe B. Zache
*Assistant Examiner*—David Y. Eng
*Attorney, Agent, or Firm*—James R. Bell; Marshall M. Truex

[57] ABSTRACT

In a data processing system having a plurality of units and a priority controller for controlling access to a bus by any of the units, each of the units is provided with a lock register having a stage corresponding to each unit connected to the bus. Each word placed on the bus by a source unit includes a lock bit which, in each unit except the source and destination units, sets the stages of the lock registers corresponding to the source and destination units. When a stage of a lock register is set it prevents the unit in which the register is located from attempting to communicate with a unit whose stage of the lock registers is set. On the last transmission between two units the word placed on the bus has a false lock bit which resets the stages of all of the lock registers corresponding to the source and destination units.

7 Claims, 17 Drawing Figures

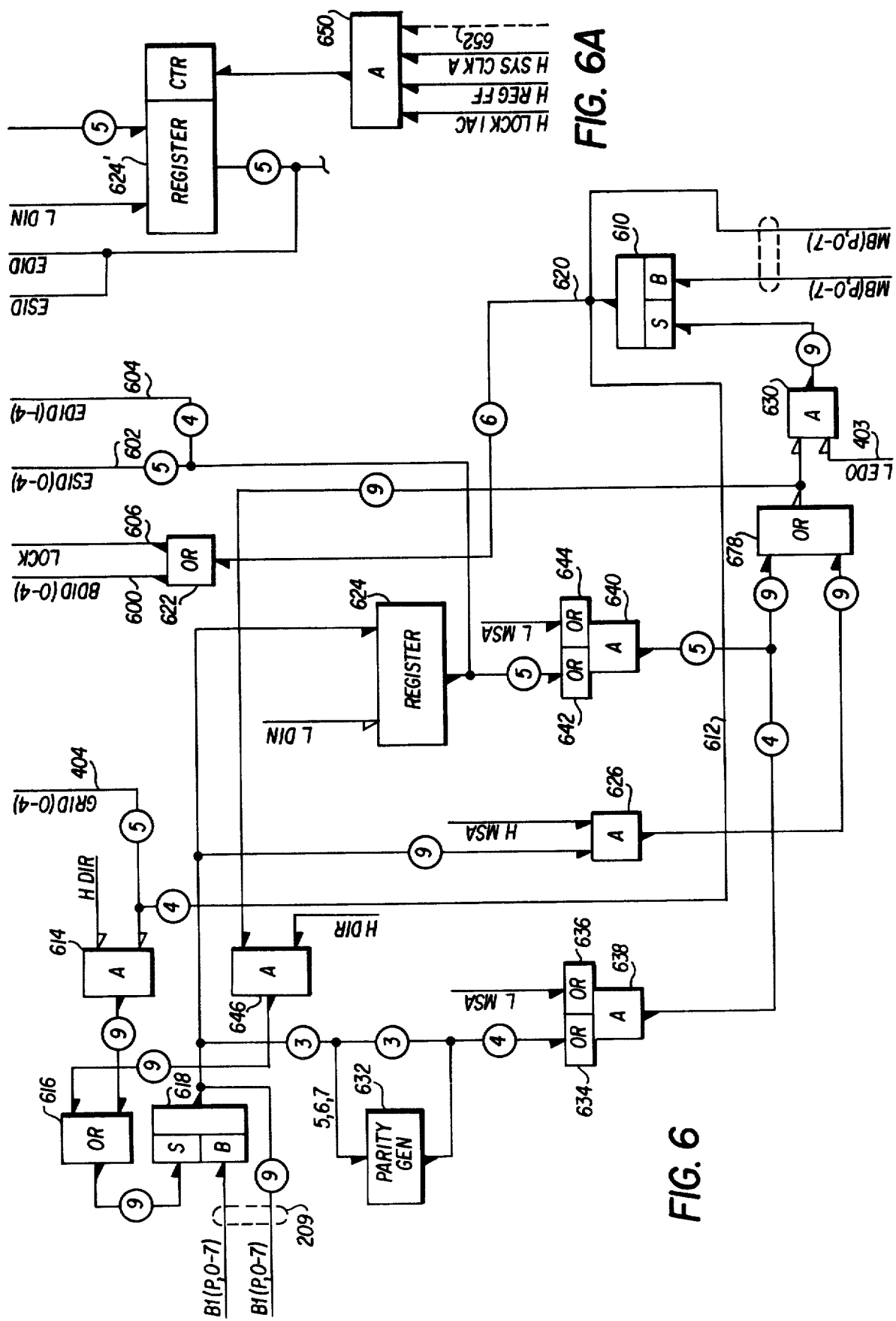

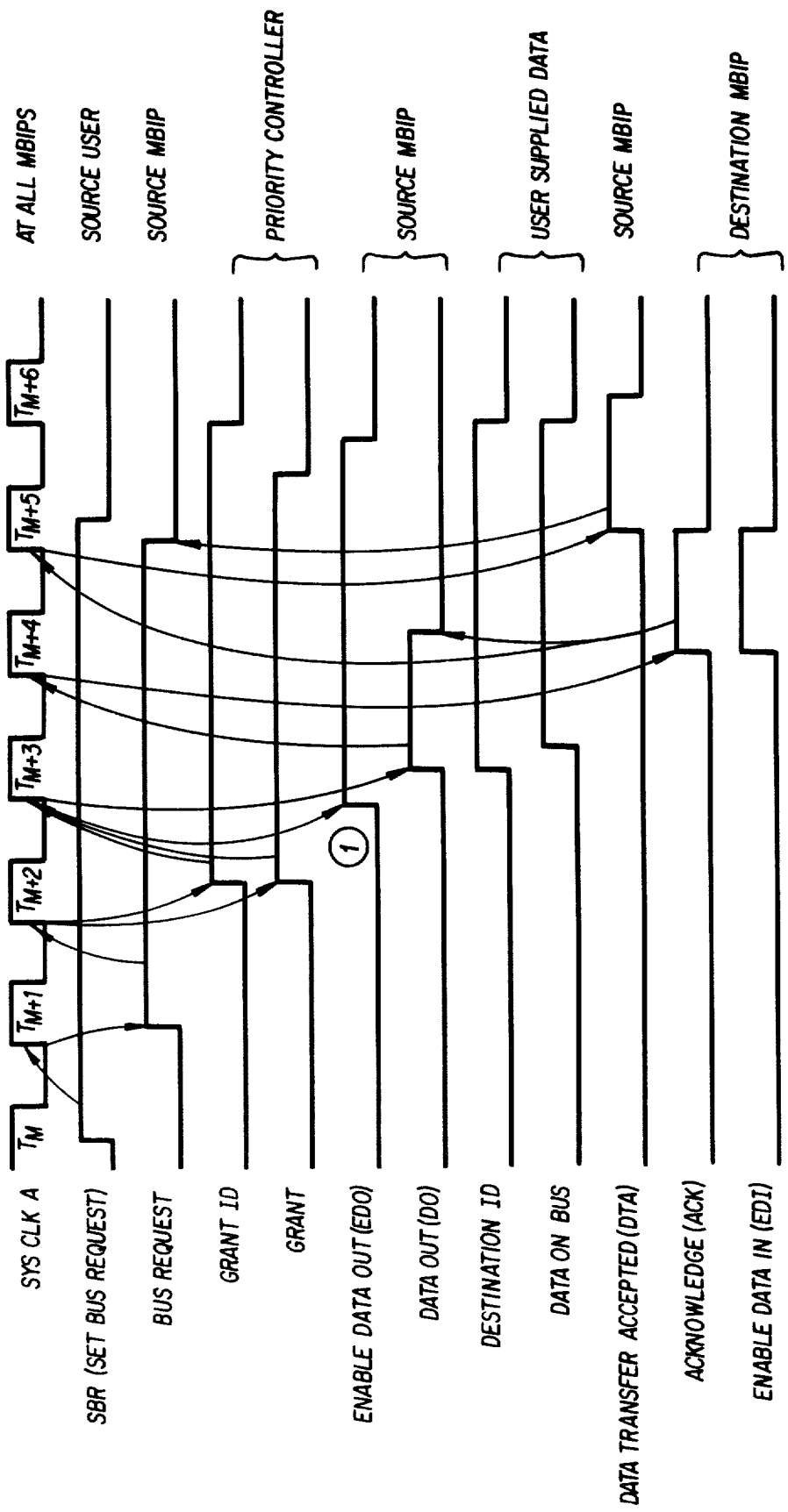
FIG. 8 M-BUS TRANSFER SEQUENCE

MAIN BUS INTERFACE PACKAGE

This application is related to the copending application of Michael H. Branigin et al., Ser. No. 140,267, entitled Address and Data Interface Unit, and filed concurrently herewith. The disclosure of this application is incorporated herein by reference. This application is also related to application Ser. No. 140,268 filed concurrently herewith, now abandoned.

BACKGROUND OF THE INVENTION

The present invention relates to data processing systems of the type having a plurality of units of different types communicating with each other over a common bus under the control of a priority controller.

The prior art discloses a data processing system wherein a bidirectional asynchronous common bus has memory, central processor and various I/O controllers connected to it. A distributed priority network grants access to the bus depending upon the highest priority unit making a request. A master or requesting unit may address a slave unit by generating its address and a function code. In addition, if the master requires a response from the slave, the master may supply its own address to the slave. Any bus cycles available between the request and response may be utilized by other units. The system employs a lock operation wherein a master unit may lock a slave unit for moe than one bus cycle. However, only one lock may be in effect at any one time even though other units may still communicate with each other on bus cycles not utilized in the "locked" operation. A lock operation is one where a link is established between two units and other units are prevented from communicating with these units until the lock is terminated.

The present invention extends the concept of locked operation in a manner which permits more than one pair of units to be locked at any given time while any unlocked unit may communicate with any other unlocked unit.

BRIEF SUMMARY OF THE INVENTION

An object of the present invention is to provide a bus control system wherein the link between two or more pairs of units may be locked simultaneously to prevent further units from communicating with them. This is accomplished by the provision of a lock register in each unit, each lock register having a stage corresponding to each unit connected to the bus.

Another object of the invention is to provide a system wherein a first unit designed to establish a link with a second unit transmits the address of the second unit over the bus, the second unit being selectively programmable to respond to any unit which places its address on the bus, or only a selected unit which places its address on the bus.

An object of the present invention is to provide a bus priority control system having a plurality of units connected to a common bus and a priority controller responsive to bus requests generated by the units for generating a grant identification identifying one of the units as a source unit having access to the bus, first means in each unit for generating a code representing the identity of the unit, second means in each unit for comparing the generated code for the unit with the grant identification and producing a signal for gating data from the unit to the bus, the unit producing the signal being designated a source unit and the data produced by the source unit including a lock bit and a destination identification code identifying one of the units as a destination unit, third means in each of the units for comparing the generated code with the destination identification code and generating an acknowledge signal upon an equal comparison, the acknowledge signal being returned over the bus to all units, lock register means in each of the units, each of the registers having a stage corresponding to each of the units, and forth means in each of the units responsive to the acknowledge signal, the grant identification, the destination identification code and the lock bit for selectively setting and resetting the stages of the lock registers corresponding to the source unit and the destination unit.

A further object of the invention is to provide a bus control system as described above wherein the forth means includes mean for setting the stages of the lock registers corresponding to the source unit and destination unit if the lock bit is active, and resetting the stages if the lock bit is inactive, the system further including means for inhibiting the operation of the fourth means in the source and destination units.

A further object of the invention is to provide a bus control system as described above wherein each of the units comprises a user device and a bus interface means, the first, second and third and fourth means and the registered means being included in the bus interface means.

A further object of the invention is to provide a bus control system as described above wherein each user device includes means for applying a set bus request to its associated bus interface means when it has data ready for gating onto the bus, the bus interface means including means responsive to the set bus request for applying a bus request to the priority controller, a selector means connected to the lock register means, means for applying an expected destination code to the selector means to gate through the selector means a signal indicating the availability of a unit which is the intended destination of the data, and means responsive to the signal indicating the availability of the intended destination unit for inhibiting the means which applies the bus request to the priority controller.

Still another object of the invention is to provide a bus control system as described above wherein each of the units includes means for placing a negative acknowledge signal on the bus if the means comparing the generated code and the destination code produces a signal and the unit is unable to accept data from the bus, the user device in at least two of said units being alike and a third unit including means for modifying the destination identification code whereby said third unit seeks to communicate with a second of said two units if the first of said two units is not available.

Yet another object of the invention is to provide a bus control system as described above wherein a first communication between a source unit and a destination unit is subsequently followed by a second communication in which the former source unit is the destination unit and the former destination unit is the source unit, the bus being available for use by other units during the interval between the first and second communications.

Other objects of the inventin and its mode of operation will become apparent upon consideration of the following description and the accompanying drawings.

BRIEF DESCRIPTION OF THE DRAWINGS

FIGS. 1A-1C illustrate the bit formats for a Destination ID byte, an Internal Register byte and a Grant Indentification byte, respectively;

FIG. 4A illustrates the logic of the interrupt generator shown in FIG. 4;

FIG. 5A illustrates the logic of the bus request generator shown in FIG. 5;

FIG. 6 illustrates details of the M-Bus protocol hybrid shown in FIG. 2;

FIG. 6A illustrates a modification of the M-Bus protocol hybrid;

FIG. 8 is a waveform diagram illustrating the relative timings of various signals during a bus transfer; and, FIG. 9 is a system block diagram illustrating the use of the modified M-Bus protocol hybrid.

DETAILED DESCRIPTION OF THE INVENTION SYSTEM OVERVIEW

Figure 1:
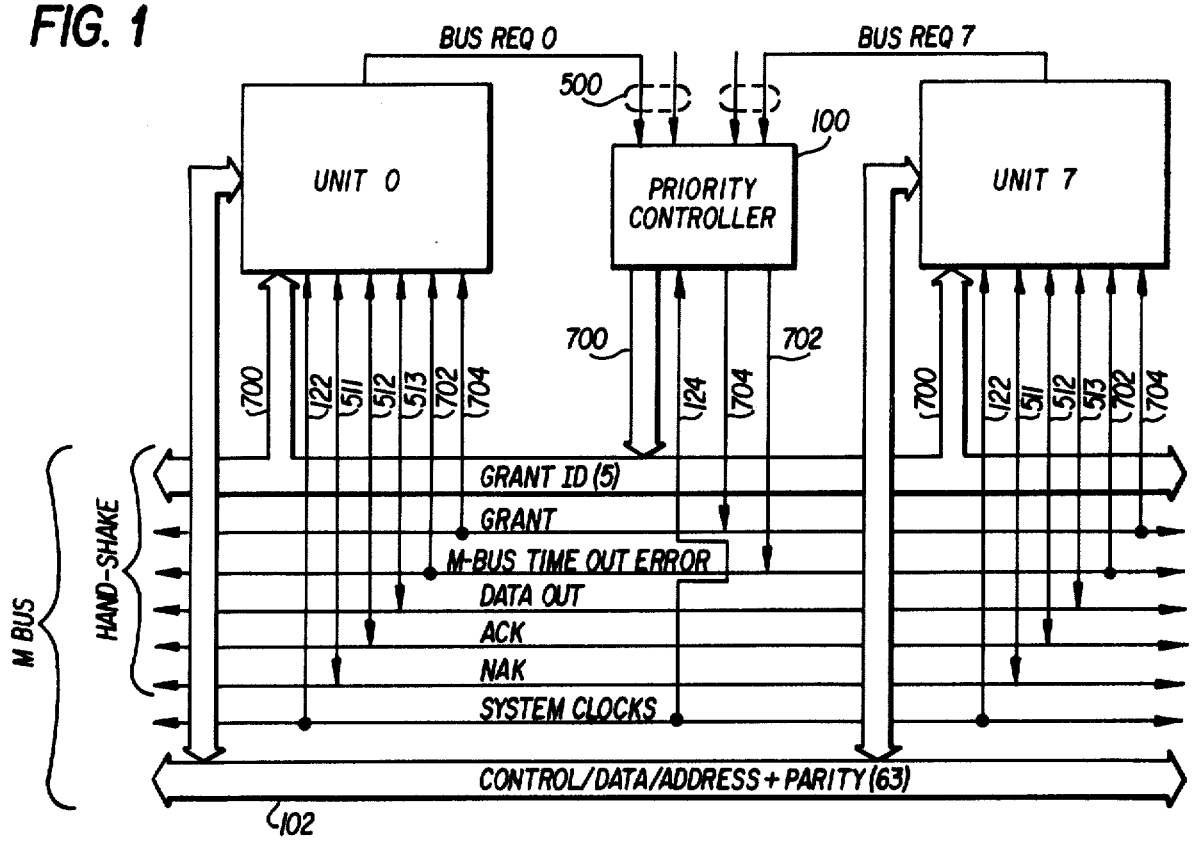
FIG. 1 is a block diagram of a system embodying the present invention.

The present invention provides a means for controlling the transfer of data between a plurality of units connected to a common bus. FIG. 8A is a timing diagram illustrating the times of occurrence of various signals when a transfer is made between two units over the common bus, and should be considered in the following description. FIG. 1 shows two units, designated unit 0 and unit 7, connected to a common bus designated the M-Bus. Although only two units are shown, it will be understood that additional units may be added as desired. A priority controller 100 is provided for determining which unit is to be granted access to the M-Bus when more than one of the units desires to use the M-Bus at the same time. When a unit desires access to the bus it generates a signal BUS REQUEST on a lead 500. The priority controller 100 resolves conflicting bus requests and generates a 5-bit output code GRANT ID on bus 700 identifying the unit granted priority. At the same time, the priority controller 100 generates the signal GRANT on lead 704. The GRANT ID code and the GRANT signal are applied over the M-Bus to all of the units connected to the bus. The priority controller 100 includes circuits for generating a signal M-BUS TIME OUT ENABLE on lead 702 if any unit granted priority does not terminate its bus request signal to the priority controller within a given length of time.

Once a unit is granted priority, it becomes a source unit. It places a word on the DA Bus 102, which is part of the M-Bus, and generates the signal Data Out (DO) on lead 513 to indicate to all units that information is on the M-Bus. The word placed on the M-Bus, or more specifically on the DA Bus 102, comprises 7 bytes each including 8 bits plus parity. Generally speaking, byte 0 contains a function code while bytes 2-6 contain true data or address information. This however can vary depending upon the types of units involved in the data transfer. Byte 1 placed on the DA Bus by the source unit may have the format illustrated in FIG. 1A. Bits 0-3 comprise a Destination ID (DID) which identifies the destination unit with which the source unit desires to communicate. Bit 4 is a parity bit for DID. Bit 5 is a lock bit the function of which is described below. Bit 6 is the next direction bit and it provides to the destination unit an indication as to whether the next data transfer will also come from the source unit, (bit 6=1) or is expected from the destination unit (bit 6=0). Bit 7 is an error flag, the function of which is not important to an understanding of the present invention. Bit P is the odd parity bit for bits 0-7 of byte 1.

All of the units connected to the M-Bus receive every Destination ID transmitted over the bus. Each unit has a hardwired 4-bit plus parity identification code caled the Wired ID (WID) and the Destination ID is compared with the wired ID in each unit. The unit where the wired ID and the destination ID are compared and found equal becomes the destination for receiving the information placed on the M-Bus by the source unit. If the destination unit is able to accept the data it does so and generates an acknowledge signal (ACK) on the bidirectional lead 512 which is transmitted over the M-Bus to all units. The source unit receives this acknowledge signal and in turn terminates its bus request to the priority controller.

If the destination unit is expecting to receive data from a source other than the one presently granted priority, it generates the negative acknowledge (NAK) signal on lead 511 which is sent out over the M-Bus to all units. This signal also causes the source unit having control of the bus to terminate its bus request to the priority controller. Thus, either the ACK or the NAK causes the source unit to relinquish control over the bus and thus terminate the transfer. In the case where a source unit having control over the bus receives a NAK it must internally decide what course of action to take, and, if it so desires, may again attempt communication with the destination unit but it must again contend for priority and be granted access to the bus before it can attempt the subsequent communication.

It should be noted that normally two operations like that described above must be carried out in order to complete a transfer between two units. For example, assume that unit 0 wishes to obtain information from unit 7. Unit 0 requests priority from priority controller 100 and when it is granted priority it places function and possibly address information in bytes 0 and 2-6 on the M-Bus while byte 1 contains the DID of unit 7. In addition, the lock bit in byte 1 is set because there is to be further dialogue between the units (i.e., when the information requested by unit 0 is transferred thereto by unit 7) and the direction bit of byte 1 is 0 to indicate that the next transfer in the dialogue between the two units will not be initiated by unit 0.

If unit 7 is available to accept the information from the M-Bus, the information is accepted and unit 7 sends back the ACK signal over lead 512 to unit 0. Unit 0 drops its BUS REQUEST and this phase of the transfer is completed. When unit 7 is ready to transfer to unit 0 the information which unit 0 requested, unit 7 must make a bus request to the priority controller 100 and contend for priority on the bus in the same manner as previously done by unit 0. When unit 7 is granted priority it then becomes a source unit and places its information on the M-Bus and generates the signal DATA OUT on lead 513. The information on the M-Bus includes the DID of unit 0; and when unit 0 recognizes its DID on the M-Bus, it accepts the data from the M-Bus and generates the ACK signal on lead 512. This ACK signal is returned to unit 7 which then terminates its bus request thereby completing the transfer between the two units. Thus, any unit on the bus may serve as a source unit or a destination unit; and in the ususal dialogue, a unit serves first as one and then the other.

In the above example, a period of time elapses between the time unit 0 relinquishes control of the M-Bus and unit 7 makes its bus request. For example, unit 7 might be a main store processor or storage adaptor which has to obtain the requested information from memory before it can respond to unit 0. During the latency period between the termination of the bus request by unit 0 and initiation of the bus request by unit 7, the M-Bus may be utilized by other units connected to the bus. This is made possible by utilizing a lock register in each of the units, each lock register having one stage for storing an indication of whether or not its associated unit is busy, or is awaiting a response from another unit and thus is unavailable for communication with a third unit. Bit 5 of byte 1 on the M-Bus is the lock bit which is used to selectively set and reset individual positions in the lock registers as the various communications are carried out. Every time a unit places a word on the M-Bus, it makes the lock bit in byte 1 true (one) if there is to be further dialogue between the same two units, and makes the lock bit false (zero) in the last word being transferred during a dialogue. The manner in which this is carried out will become clear as the various logic circuits are subsequently described.

It should be noted that the above description is an example of a simple exchange wherein unit 0 requested and received only one word from unit 7. Multiple word transfers are possible during a dialogue. For example, unit 0 might request four words from unit 7. The first transfer would be carried out as described above with the lock bit and direction bits in the word transferred by unit 7 both being set. Second, third and fourth words would then be placed on the M-Bus in exactly the same manner with unit 7 contending for bus control before each transfer. In the fourth word placed on the M-Bus by unit 7, the lock bit would be zero to reset the stages of the lock registers coresponding to units 0 and 7, thus telling all units that units 0 and 7 are free to establish a dialogue with them. In addition, the direction bit in the fourth word is made zero to tell unit 0 that there will be no further words coming to it from unit 7 during the present dialogue.

Figure 2:
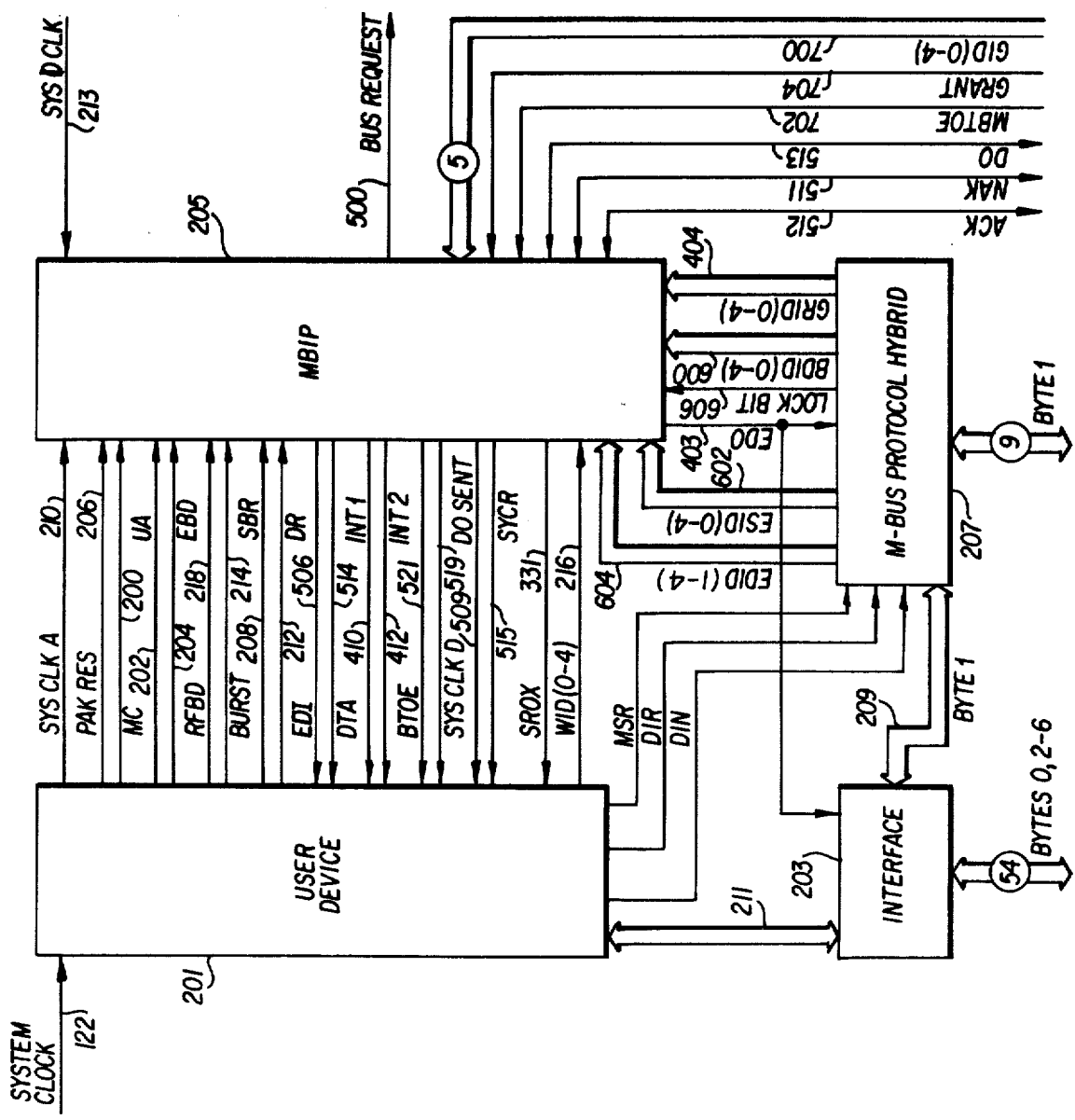
FIG. 2 is a block diagram of the elements included within one of the units shown in FIG. 1.

FIG. 2 illustrates a typical unit such as unit 0 or unit 7 of FIG. 1. A typical unit includes a user device (user) 201, an interface 203, a Main Bus Interface Package (MBIP) 205 and an M-Bus Protrocol Hybrid (MPRT) 207. The user device 201 may be a central processing unit, a main storage processor, a specialized storage adaptor, an input/output channel, or any one of many types of units normally connected to a common bus. The user devices in the units do not have to be the same and any mix of user devices is permissible.

A user device 201 is connected through an interface 203 to the M-Bus. The interface 203 may comprise seven Address and Data Interface Units (ADIUs) as disclosed in the aforementioned copending application of Michael H. Branigin et al. Each ADIU includes a register for storing a byte wide slice of data, and bidirectional buses for receiving information from a user device and applying it to the M-Bus or more specifically to the DA Bus. Bytes 0 and 2-6 are transferred directly between interface 203 and the M-Bus. Byte 1 is transferred between the M-Bus and the interface through the MPRT 207.

The MBIP 205 is the element in each unit which works in conjunction with the priority controller 100 to establish a link between a source unit and a destination unit. It generates and monitors the bus protocol signals to control information being transferred on the DA Bus 102. The MBIP enables all units on the bus to be indistinguishable as a source or destination unit until a bus dialogue is established between two units. When the MBIP receives the signal SET BUS REQUEST on lead 208 from the user device it controls generation of the BUS REQUEST signal which goes to the priority controller 100 over lead 500. When the priority controller grants priority, the grant signal on lead 704 and the grant ID on Bus 700 are returned to the MBIP. It is also the MBIP which receives and generates the bidirectional handshaking signals ACK, NAK and DATA OUT (DO).

The MBIP receives several different signals from the user device and in turn generates many signals which are applied to the user device. The number of signal connections between a user device and the MBIP may vary depending upon the particular type of user device with which the MBIP is associated. FIG. 2 shows a full complement of these connections and their use is subsequently described. However, it should be understood that the user device 201 and the interface 203 are not essential to the novelty of the present invention and all of the control connections between them are not shown in FIG. 2.

The MPRT 207 may be provided depending upon the particular type of user device included in the unit. However, in other units the user device may be such that the functions of MPRT 207 may be performed within the user device 201. In this case, all 7 bytes on the DA Bus 102 may be applied directly through interface 203 to the user device.

The MPRT 207 handles byte 1 transfers to or from the M-Bus. When a unit is acting as a destination unit, MPRT 207 receives the Destination ID and generates the signals BDID (0–4) which are applied over Bus 600 to the MBIP. The MPRT 207 also provides the signals Expected Destination Identification signals EDID (0–3) and Expected Source Identification signals ESID (0–4) which are applied over buses 602 and 604 to the MBIP. The GRANT ID signals GID (0–4) from the priority controller are buffered by MBIP 205 and applied to MPRT 207 over a bus 404.

When MPRT 207 receives byte 1 from the M-Bus, or places a byte 1 on the M-Bus, it applies to its associated MBIP a signal designated LOCK BIT depending on whether the lock bit of byte 1 is a 0 or a 1. This signal is applied to the MBIP over a lead 606.

When the MBIP is granted priority in response to one of its requests, it generates the signal ENABLE DATA OUT (EDO) on lead 403. This signal is applied to MPRT 207 to gate byte 1 onto the M-Bus, and to the interface 203 to gate bytes 0 and 2–6 onto the bus.

MAIN BUS INTERFACE PACKAGE

Figure 3:
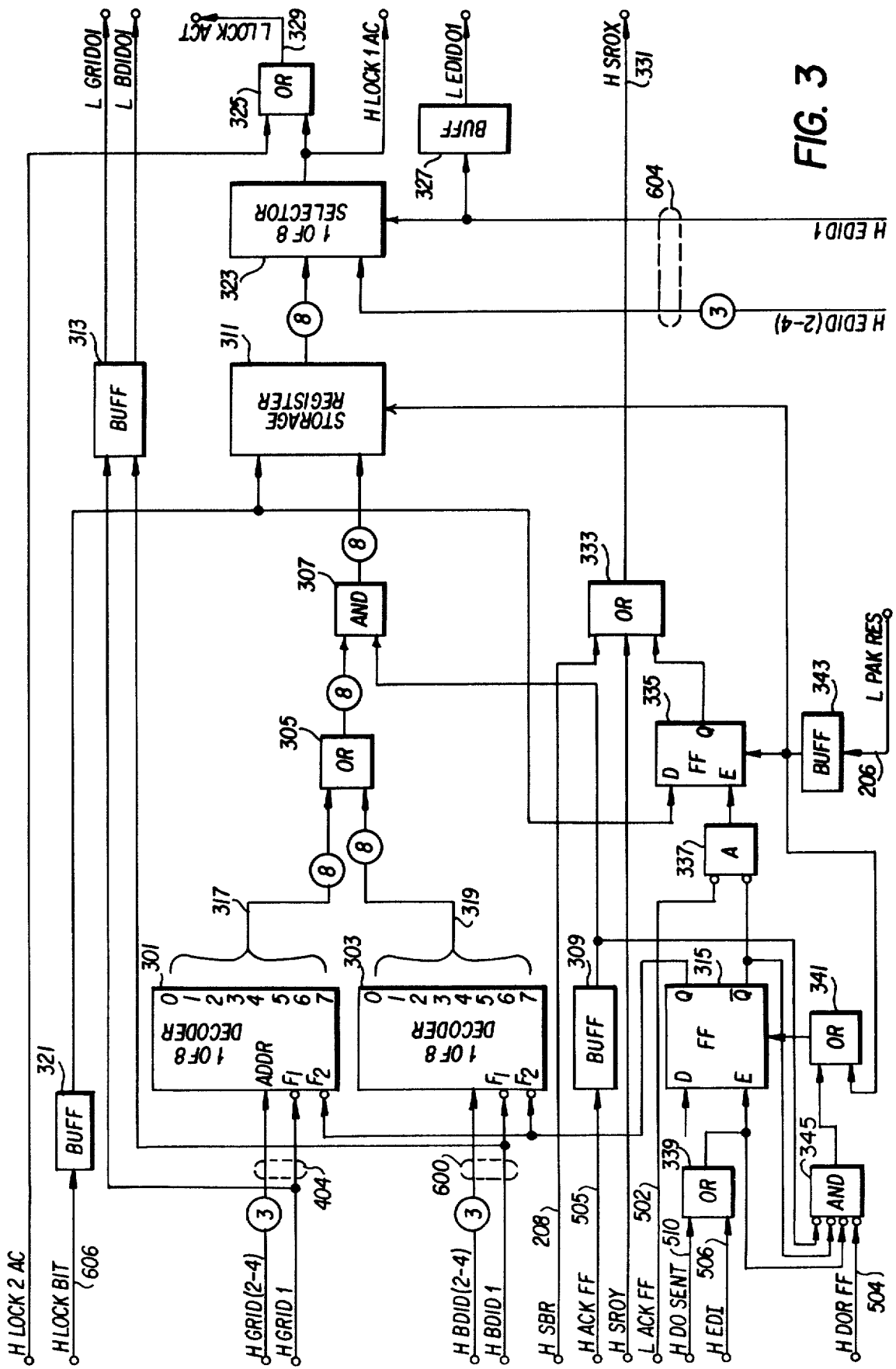
FIGS. 3, 4 and 5 are functional block diagrams of three hybrid circuits contained within the main bus interface package.
Figure 4:
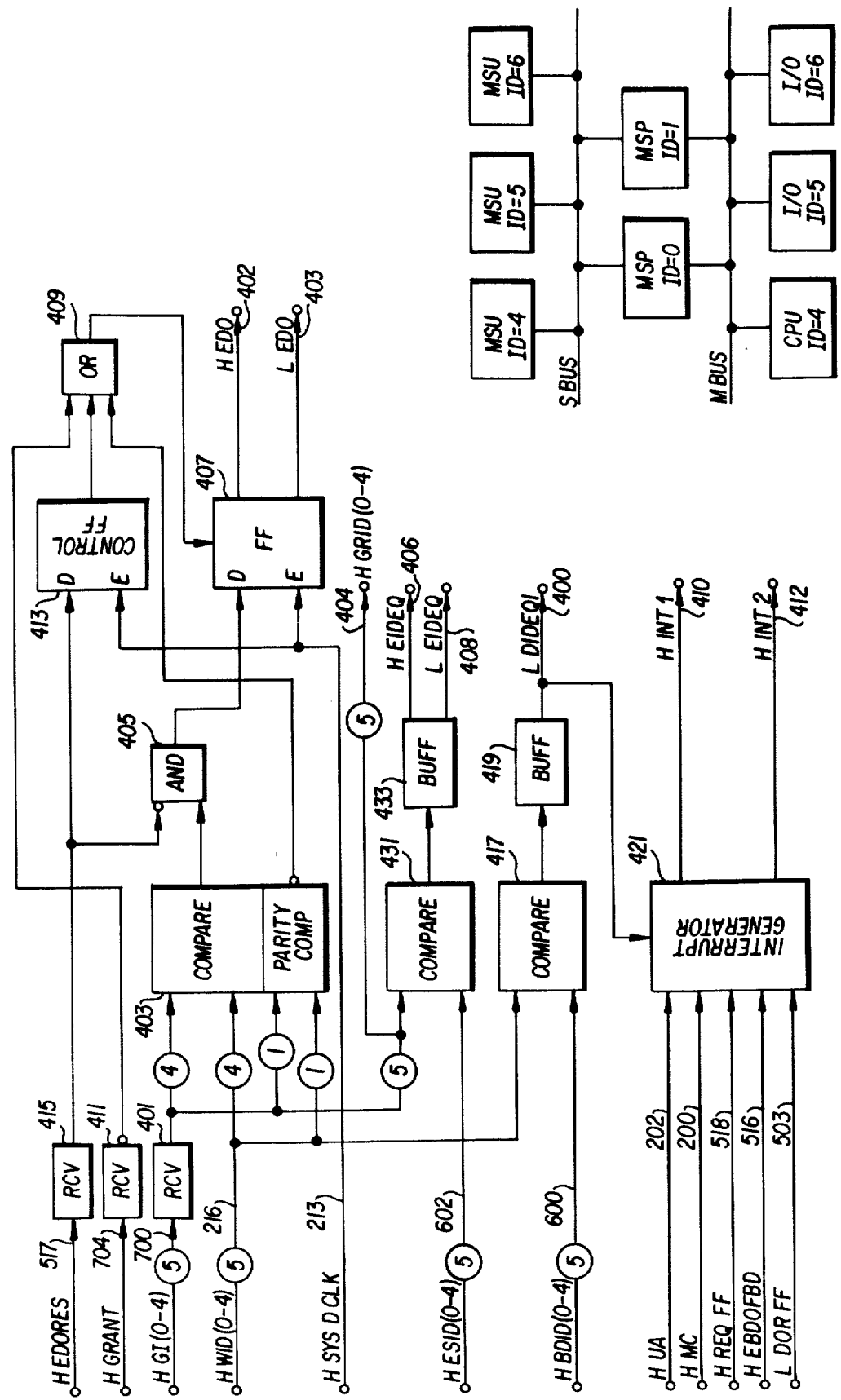
Figure 5:
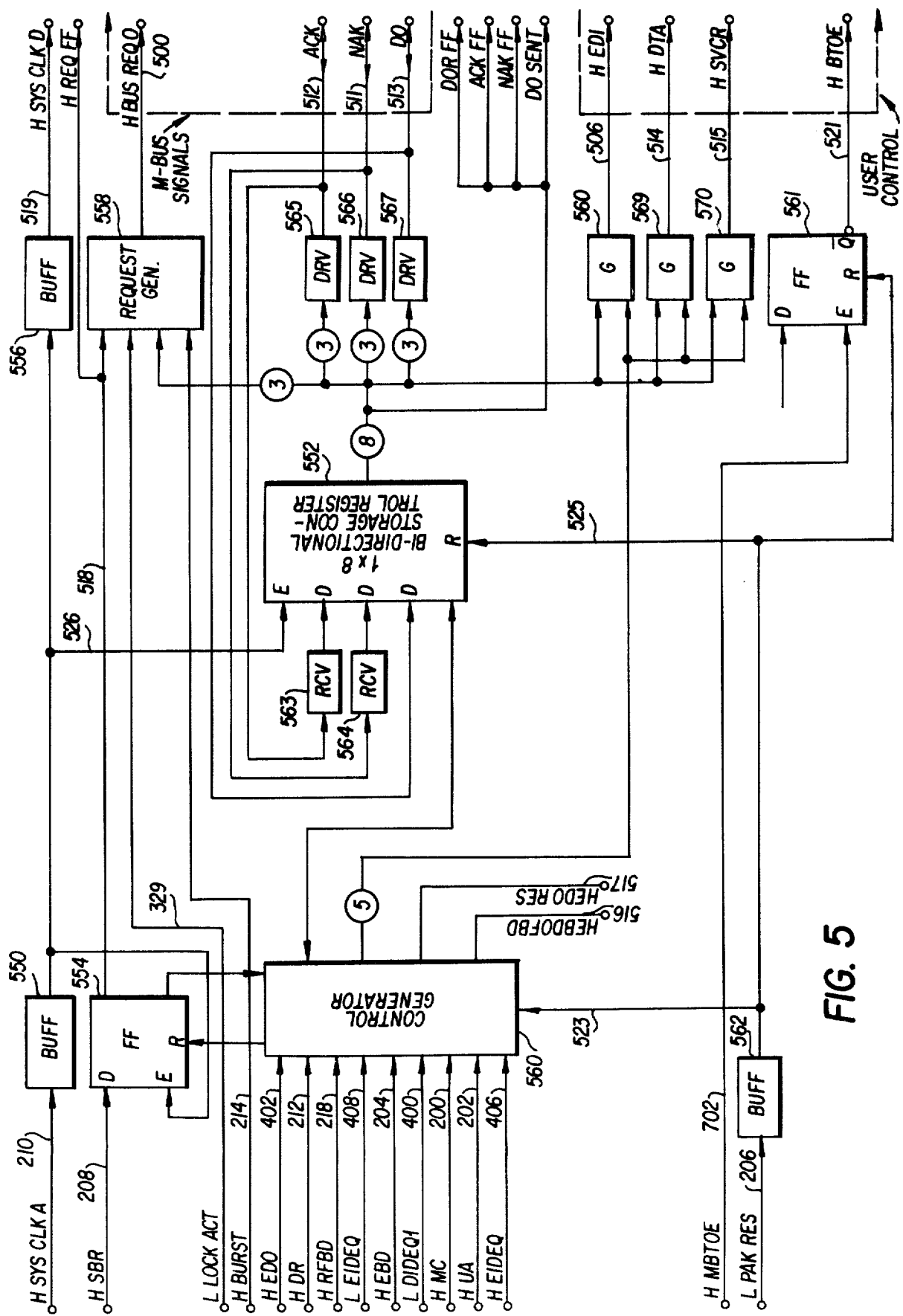

FIGS. 3, 4 and 5 are functional block diagrams of three hybrids which make up one of the MBIPs 205. The hybrid shown in FIG. 3 includes two decoders 301 and 303 having their outputs connected to a set of eight ORs 305. The outputs of ORs 305 are applied to one set of inputs of eight ANDs 307 which are enabled by the output of a buffer 309 when the signal ACK FF on lead 505 is true. The outputs of ANDs 307 are applied individually to the stages of an 8-bit Lock Register 311.

When a unit makes a bus request to the priority controller and the priority controller grants the request, the GRANT ID signals GID (0-4) are applied to the hybrid of FIG. 4 where they pass through a set of receivers 401 to become the signals GRID (0-4) on leads 404. In FIG. 3, GRID 1 is applied to an enabling input of decoder 301 while GRID (2-4) are applied to addressing inputs of the decoder.

To digress for a moment, GRID (1-4) may represent anyone of 16 different values thus permitting up to 16 units to be connected to the M-Bus and controlled by the priority controller 100. However, each hybrid of the type shown in FIG. 3 has only an 8-bit lock register for indicating the status of communications between eight of the different units. Thus, two hybrids similar to that shown in FIG. 3 must be provided if 16 units are connected to the bus. GRID 1 is the high order bit of the GRANT ID and thus will be false if the unit granted priority is one of the units 0-7 and will be a 1 if the unit granted priority is one of the units 8-15. The unit with the lowest number has the highest priority when contending for the bus. Thus, the hybrid shown in FIG. 3 is specifically intended for use in connection with the 8 higher priority units. The signal GRID 1 is passed through one of two buffers 313 to a decoder in a second hybrid like that of FIG. 3 if there are more than 8 units connected to the M-Bus.

The purpose of decoder 301 is to monitor the GRANT ID produced by priority controller 100 on bus 700 in response to a bus request from one of the units. The GRANT ID is applied to the decoder 301 in every unit attached to the M-Bus. A flip-flop 315 in the source and destination units for a given bus grant blocks the decoders 301 for these units. However, all other decoders 301 have one input enabled by the output of the flip-flop. A second input is enabled by GRID 1. Thus these decoders decode GRID (2-4) to produce one of eight output signals on leads 317 indicating which unit has been granted priority.

When a unit is granted priority it becomes a source unit and places data on the M-Bus. This data includes in byte 1 the Destination ID (FIG. 1A) identifying the destination involved in the dialogue. If the destination is to respond with information to the source unit the lock bit in byte 1 placed on the M-Bus by the source unit is set. The lock bit and the Desination ID are applied to all MPRTs 207 (FIG. 2) and the MPRTs generate the signals LOCK BIT and BDID (0-4) which are applied to their associated MBIPs. More specifically, the outputs of the MPRTs are applied to decoders 303 in all units. Like decoders 301, decoders 303 are enabled by the output of a Flip-Flop 315 only in those units that are not involved in the dialogue. At each decoder 303, the signal BDID1 further enables the decoder and it decodes the signals BDID (2-4) to produce an output signal on one of eight leads 319. Thus, in every MBIP except the two engaged in a dialogue, one of the leads 317 and one of the leads 319 is active thus indicating a source unit and a destination unit with which other units on the bus should not attempt to communicate. The signals on leads 317 and 319 pass through two of the ORs 305 and enable inputs of two of the ANDs 307. When the destination unit generates an acknowledge signal on lead 512 it passes over the M-Bus to all units. In each unit it sets an acknowledge flip-flop. The acknowledge flip-flop for a particular unit then produces an output signal on lead 505 which passes through the buffer 309 to enable the ANDs 307. Two of the ANDs 307 thus enable two stages of the Lock Register 311 and these stages are set if the lock bit in byte 1 of the M-Bus is set. After passing through each MPRT 207 the lock bit enters the associated MPIPs where it passes through a buffer 321 to the data inputs of all stages of the lock register. However, only those two stages enabled by the outputs from ANDs 307 are set.

In the last word transferred between two units during a dialogue, the source unit sets the lock bit in the word to zero. In this case, the output of buffer 321 resets those stages of the lock registers corresponding to the source and destination units when the ACK FF signal enables the ANDs 307.

When a user wishes to initiate a transfer over the data bus, it sends a Set Bus Request to its MBIP but the MBIP makes a bus request to the priority controller only if the destination unit with which it wishes to communicate is available. The availability of the destination unit is indicated by the status of its corresponding bit in the lock register 311 of all MBIPs. When a user device 201 is ready to initiate a communication it loads bytes 0 and 2-6 into interface 203 and applies byte 1 to the MPRT 207 before it sends the Set Bus Request to its MBIP. The MPRT senses the Destination ID in byte 1 and generates the expected (desired) destination signals EDID (1-4). For units 0-7 EDID 1 is false and in FIG. 3 it enables a one-of eight selector 323. Bits EDID (2-4) are applied to addressing inputs of selector 323 to select one of eight inputs. These eight inputs are the outputs from the eight stages of the Lock Register 311. If the destination unit which the user desires to communicate with is busy, its stage of the lock register is set and the resulting output signal passes through selector 323 and an OR 325 to generate the signal L LOCK ACTIVE. When this signal is low, it inhibits a bus request generator (FIG. 5A) in the MBIP so that the unit cannot send a BUS REQUEST to the priority controller.

The signal EDID 1 is passed through a buffer 327 to generate EDID 01. This latter signal is utilized as an enabling signal for a selector 323 in a circuit like that of FIG. 3 if there are more than eight units connected to the bus. The leads carrying the signals H LOCK 2AC and H LOCK 1AC are provided for the same reason.

FIG. 3 also shows the circuits for generating the signal STATUS REQUEST OUTSTANDING (SROX). This signal appears on lead 331 and is made available to the user associated with the MBIP to provide an indication of an implied source/destination dialogue in progress. The signal SROX is provided by an OR 333. The generation of SROX varies according to whether a particular unit is a source or a destination in a dialogue. SROX is generated by a source when the MBIP receives the signal SET BUS REQUEST (SBR) over lead 208 from the user device. The signal SBR is passed through OR 333 to generate SROX. The signal SROX remains active independent of the bus request according to the setting of a flip-flop 335. This flip-flop has a data input which receives the lock bit output of buffer 321 and an enabling input connected to the output of an AND 337. AND 337 receives the signal L ACK FF on lead 502 at one input and the output of flip-flop 315 at the other. The flip-flop 335 is set at the leading edge of L ACK FF provided the lock bit is true and the flip-flop 315 has previously been set. It is reset under the same conditions when the lock bit is false. In a source, the flip-flop 315 is set by the leading edge of the signal DATA OUT SENT on lead 510 which passes through an OR 339 to the enabling input of flip-flop 315. In a destination MBIP, the generation of SROX is substantially the same as described above. However, at the receiving participant the user does not generate SBR. Also, the flip-flop 315 is set at the leading edge of the signal ENABLE DATA IN (EDI) which is applied to the flip-flop through OR 339.

An OR 341 controls the reset of flip-flop 315. OR 341 receives the signal PACK RESET from a buffer 343 to reset flip-flop 315. PAK RES is a signal from the user and may be derived from a system reset signal applied to the user. In addition to resetting flip-flop 315, the output of buffer 343 resets flip-flop 335 and all of the stages of the Lock Register 311.

An AND 345 receives the signal DATA OUT RECEIVED FLIP-FLOP (DOR FF) over the lead 504, the signal ACK FF from the output of buffer 309, the output of OR 339, and the set output of flip-flop 315. Thus, AND 345 produces an output signal through OR 341 to reset flip-flop 315 if the flip-flop is set, and the signals DATA OUT SENT, EDI, ACK FF and DOR FF are all false.

FIG. 4 is a functional block diagram of the MBIP hybrid containing the circuits for determing whether a unit participates in a bus dialogue, and if so, if it is to participate as a source unit or a destination unit. The Grant ID, that is GID (0–4) generated by the priority controller in response to a BUS REQUEST, is applied to all of the MBIPs connected to the bus. In each MBIP it enters the circuits of FIG. 4 through a receiver 401 and is applied to one set of inputs of a comparator 403. The comparator 403 in each MBIP receives from its associated user device a 5-bit code which is hardwired or permanently applied to the comparator 403 from the user device. Comparator 403 compares GID (0–3) with WID (0–3) and separately compares the parity bits GID 4 and WID 4. When GID (0–3) and WID (0–3) are compared and found equal, comparator 403 produces an output signal that is applied through an AND 405 to an Enable Data Out flip-flop 407. The flip-flop 407 is set concurrently with the leading edge of the system delayed clock. This signal is produced by a delay line (not shown) which is driven by the system clock so that it produces the system delayed clock 19–20 nanoseconds after the system clock. If the parity bits of GID and WID do not compare, the comparator 403 produces an output signal through an OR 409 to the flip-flop 407 to prevent the setting of the flip-flop. The GRANT signal from the priority controller must be true in order to set flip-flop 407. The GRANT signal appears on lead 704 and is applied through a receiver 411 to the OR 409. If GRANT is not true, then the output of OR 409 prevents the setting of the flip-flop.

The output of flip-flop 407 is the signal EDO which is applied to the interface 203 and MBPT 207 (FIG. 2) to gate the data from the source unit onto the M-Bus. The flip-flop 407 remains set until a flip-flop 413 is set by the signal ENABLE DATA OUT RESET. This signal is derived in FIG. 5C and occurs when there is a system reset or when the destination unit involved in the dialogue returns an ACK or a NAK signal to set the ACK or NAK flip-flop in the source unit. ENABLE DATA OUT RESET appears on lead 517 and is applied through receiver 415 to the flip-flop 413. The flip-flop is set on the leading edge of the system delayed clock signal appearing on lead 213.

Comparator 417 comes into play when a unit is to act as a destination. The wired identification code WID (0–4) from the user device is applied to one set of inputs of comparator 417. The MPRT 207 for each unit monitors byte 1 of all data placed on the M-Bus and generates the signals BDID (0–4) corresponding to the DID carried in byte 1. When WID (0–4) equals BDID (0–4), comparator 417 produces an output signal through a buffer 419 to generate the signal DIDEQ1 on lead 400. As subsequently explained with reference to FIG. 5, this signal will set a NAK or ACK flip-flop in the destination unit so that it will generate an ACK or NAK signal which is sent back over the bus to the source unit.

The signal DIDEQ1 is also applied to an Interrupt Generator 421 to generate an interrupt signal which is sent from the MBIP to the destination user informing it that the data on the bus is for that user. The logic circuits included in the Interrupt Generator 421 are shown in FIG. 4A and include four ORs 423, 425, 427 and 429.

The interrupt generator receives the signal REQUEST FF on lead 518. This signal is generated in FIG. 5 and is true when the Request flip-flop in the MBIP is set by a SET BUS REQUEST from the associated user. The signal REQUEST FF is applied to OR 429 and through an OR 423 to an OR 425. The signal UNIVERSAL ACCEPTOR (UA) is applied to ORs 425 and 429. This signal is generated by the user device and applied to the MBIP to tell the MBIP that the unit (acting as a destination unit) is to accept data transfers over the bus even though the data may be coming from a source unit from which the destination unit is not expecting data.

The signal DATA OUT RECEIVED FF on lead 503 is applied to ORs 425 and 429. This signal is derived from the control circuits of FIG. 5 as subsequently explained. The signal EBDOFBD on lead 516 is derived from the control circuits of FIG. 5C as subsequently explained and is applied to one input of OR 429.

The signal MASTER CONTROLLER (MC) on lead 200 is derived from the user device for purposes subsequently explained with reference to FIG. 5C. MC is applied to one input of OR 425.

The circuit of FIG. 4A operates to generate the INTERRUPT 1 signal if DIDEQ1 and DOR FF are both true while UA, EBDOFBD and REQ FF are false. The signal INTERRUPT 2 is generated on lead 412 if the signals REQ FF, DIDEQ1 and DOR FF are true while the signals UA and MC are false. Generally speaking, an Interrupt 1 signal indicates an unsolicited request while an Interrupt 2 is a bus contention interrupt. These signals are applied to the user device to inform it that it should accept the data on the M-Bus.

Returning now to FIG. 4, a comparator 431 is provided for comparing each GID with a code representing an expected source identification (ESID). Assume for the moment that unit 0 wishes to obtain data from unit 7. When unit 0 is granted priority, it places on the M-Bus (byte 1) the destination identification 0111 which identifies unit 7 as the destination of the word placed on the bus. Unit 0 must remember which unit it is expecting data from, so it stores the value 0111 with its parity and applies this information to comparator 431 as the expected source identification signals ESID (0–4). After an indeterminate time unit 7 has the data ready for unit 0 so unit 7 makes a bus request. When unit 7 is granted priority, the GID on bus 700 is applied to comparator 431 and thus the comparator 431 of unit 0 recognizes that the data on the bus is from the unit to which it previously made its request. The output signal from comparator 431 is passed through a buffer 433 to generate the signal H EIDEQ and its complement on leads 406 and 408.

The output signals from buffer 433 are applied to the third hybrid of the MBIP which is shown in FIG. 5. It is this hybrid that performs most of the control operations for the MBIP. All MBIP clocked logic which uses the system clock is contained in this hybrid. The system clock from the M-Bus is a 33⅓ megacycle signal which is applied to the user device 201 where it is phase adjusted before it is applied over lead 210 to FIG. 5. The system clock signal is passed through a buffer 550 and applied over a lead 526 to the enabling inputs of a plurality of flip-flops (FIG. 5B) contained within a bidirectional storage and control circuit 552. The output of buffer 550 is also connected to the enabling input of a Bus Request flip-flop 554. The output of buffer 550 is passed through a further buffer 556 to produce the signal SYSTEM CLOCK D on lead 519. This latter signal is delayed one logic level with respect to System Clock A and is applied to the user device 201.

The Bus Request flip-flop 554 receives the signal SET BUS REQUEST on lead 208 from the user device when the user device has data ready to be placed on the M-Bus. The signal SBR is clocked into flip-flop 554 on the leading edge of the system clock signal. The output of the Bus Request flip-flop 554 is applied to a Bus Request Generator 558. The details of the bus request generator are shown in FIG. 5A. The generator comprises four ORs 559-562 having their outputs connected to an AND 563. If the destination unit with which the user desires to communicate is not available, the signal LOCK ACTIVE on lead 329 causes AND 563 to be blocked thus preventing the request flip-flop signal on lead 518 from passing through the request generator. However, if the destination unit is available to engage in the dialogue, all inputs to AND 563 are enabled and the signal from the request flip-flop generates the BUS REQUEST on lead 500 which is applied to the priority controller 100.

The signal H REQ FF from flip-flop 554 is applied to the interrupt circuit of FIG. 4A while the signal L REQ FF is applied over lead 522 to a control generator 560. The operation of the control generator is subsequently described with respect to the logic circuit of FIG. 5C.

The signal MAIN BUS TIME OUT ENABLE (MBTOE) from the priority controller is applied over lead 702 to an MBTOE flip-flop 561. The MBTOE flip-flop, when set, produces an output signal on lead 521 which is applied to the user device to inform the user device that some unit connected to the bus has dominated the main bus for too long a period of time. Although all user devices receive MBTOE simultaneously, and may act in response thereto, it is contemplated that a master device, such as the controlling CPU in a multiple CPU configuration, will take the corrective action required.

The MBTOE flip-flop may be reset by the PAK RES signal from the user device 201. The signal PAK RES is passed through a buffer 562 and applied to reset input of flip-flop 561. The PAK RES is also applied over lead 523 to the control generator 560 and over a lead 525 to the reset inputs of the several flip-flops (FIG. 5B) in the storage control register 552.

The signals ACK and NAK from the main bus are applied through two receivers 563 and 564 to two of the flip-flops (FIG. 5B) contained within the control register 552. The signal DATA OUT from the main bus is applied directly to the input of a third of these flip-flops. The outputs of the ACK, NAK and DO flip-flops in control register 552 drive three drivers 565, 566 and 567 having their outputs connected back to the bidirectional M-Bus leads 511, 512, and 513.

Output signals from the flip-flops in control register 552 control the bus request generator 558 as subsequently explained. In addition, these flip-flops produce control signals which are applied to control generator 560, some of the flip-flops have inputs for receiving control signals from the control generator. Output signals from the control register 552 and from the control generator 560 control gating symbolically illustrated at 568, 569 and 570 to generate the signals ENABLE DATA IN, DATA TRANSFER ACCEPT and SERVICE which are applied to the user device 201.

Figure 5B:
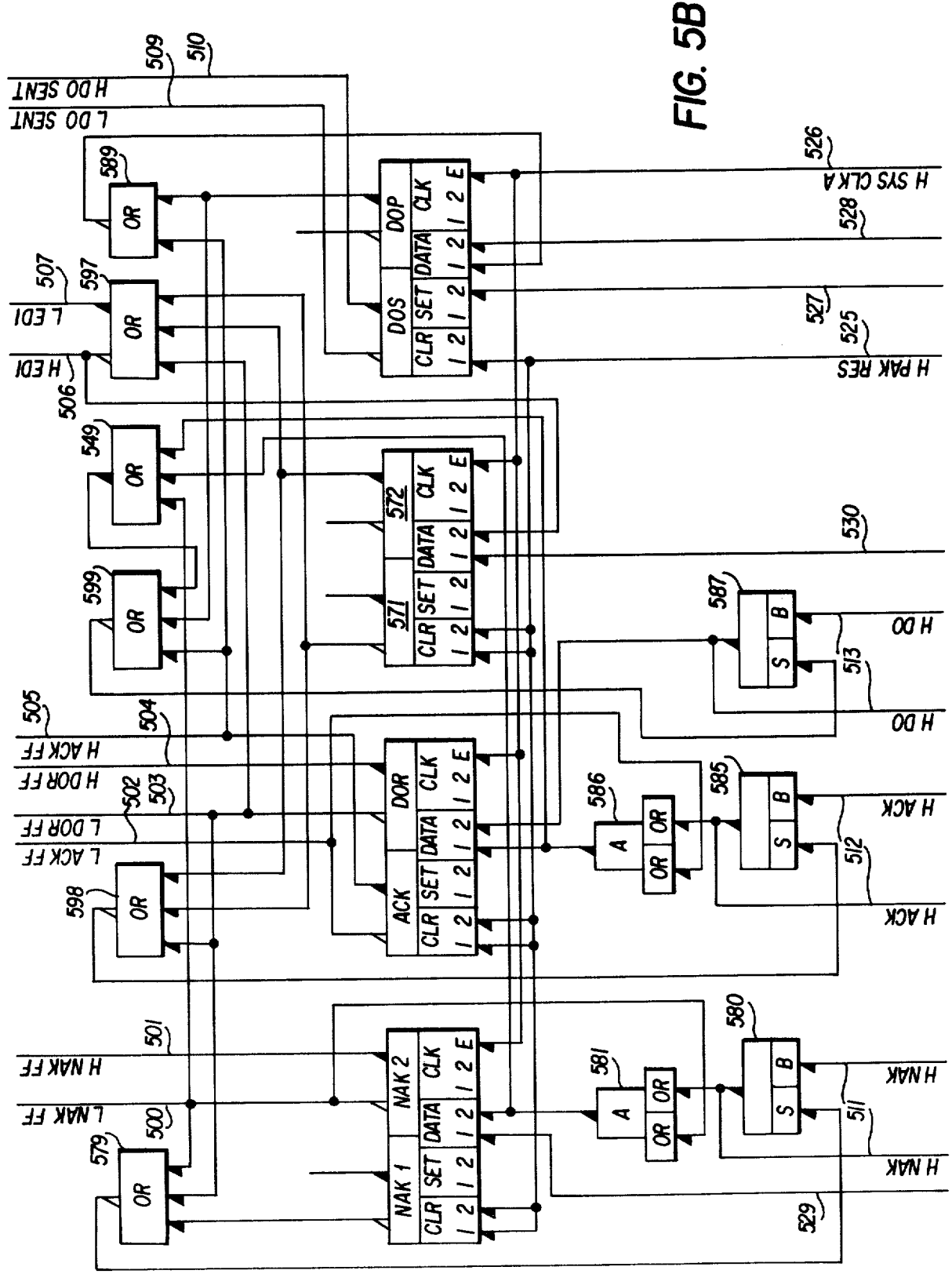
FIGS. 5B and 5C illustrates the logic of the storage control register and control generator shown in FIG. 5.
Figure 5C:
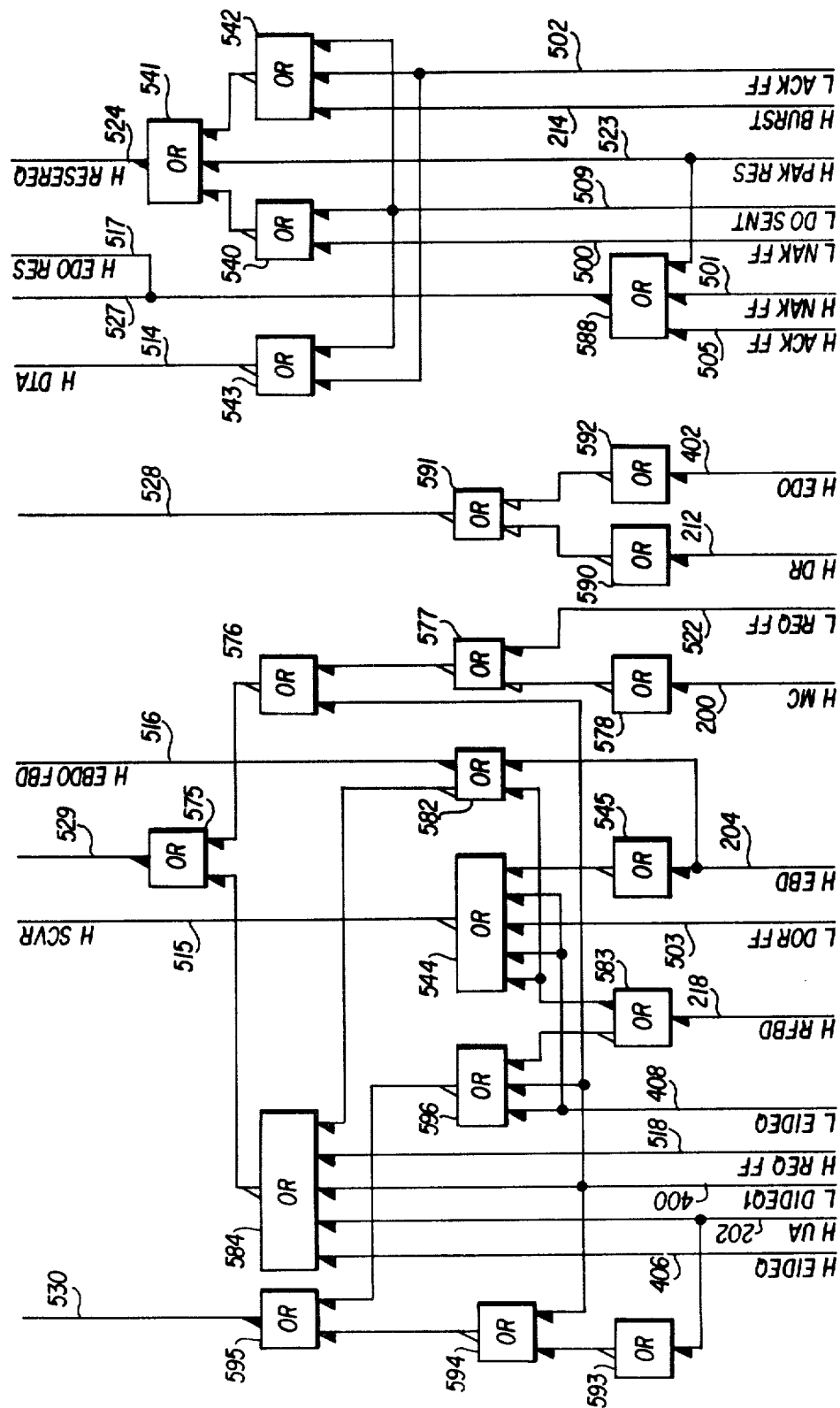

Referring now to FIGS. 5B and 5c which show the logic involved in the control register 552, control generator 560, and the gating 568, 569 and 570, these circuits include eight dual flip-flops designated NAK 1, NAK 2, ACK, DOR, 571, 572, DOS and DOP. All of these flip-flops are clocked by System Clock A derived from the buffer 550 of FIG. 5. All of the flip-flops except for the DOP FF are cleared by the PAK RES signal derived from buffer 562.

The NAK 1 flip-flop has its data input connected by a lead 529 to the output of an OR 575 in FIG. 5C. One input of OR 575 is derived from OR 576 which receives as one of its inputs the signal L DIDEQ1. The other input to OR 576 is derived from OR 577 which receives as one of its inputs the signal L REQ FF from the bus request flip-flop of FIG. 5. The signal MC from the user device is passed through an OR 578 and applied to a second input of OR 577.

The signal MC is generated by a user device when it wishes access to the bus and wishes to override any attempts by other units to communicate with it. Assume for example the unit 0 has received data from unit 7 and the dialogue using the M-Bus has been completed so that the bus is freed for use by other units. If unit 0 detects an error in the received data it is desirable to be able to report this back to unit 7 as soon as possible. However, units having a higher priority than unit 0 may be contending for priority on the bus in order to establish a dialogue with unit 0. The user device in unit 0 generates the signal MC which passes through ORs 578, 577, 576, and 575 to set the NAK 1 flip-flop. When the flip-flop is set, it produces an output signal which passes through an OR 579 and a bus connection indicated generally at 580 so that the signal NAK is placed on the M-Bus. Thus, any unit attempting to communicate with unit 0 is forced to drop its bus request.

The output of OR 579 is applied to one input of OR-AND 581 which receives as its second input the signals L NAK FF. OR-AND produces an output signal to set the NAK 2 flip-flop.

The other condition under which the NAK signal is generated is when a unit is expecting to receive data from a specific unit and a transmission from a different unit is received. In FIG. 5C, the user device 201 applies the signal EXPECTING BUS DATA (EBD) to one input of an OR 582. This signal is generated by a user device when it is expecting to receive bus data from a known source and is utilized to suspend MBIP operation until the unit arrives at the state where it can accept the data. Normally, this signal is activated by the user required to receive data after a link has been established between two units on the M-Bus. The signal is normally terminated when the data has been received, that is, when the signal ENABLE DATA IN (EDI) is generated as subsequently explained. The EBD signal is provided to the MBIP to allow a wait state within the MBIP and may not be required by all units.

The user device also generates the signal READY FOR BUS DATA (RFBD) on lead 218 and this signal is applied through an OR 583 to a second input of OR 582. RFBD is generated by the user device when it is ready to receive bus data from a known source and can retrieve the data, that is, a register is available in the user device to strobe in the data. Like EBD, RFBD should be terminated upon occurrence of EDI.

The output of OR 582 is applied to one input of an OR 584. This OR further receives the signals H REQ FF, L DIDEQ1, H UA and H EIDEQ. The signal H REQ FF is false if the MBIP is awaiting data. The signal UA is generated by the user device when it is willing to accept data from any source without regard to that unit being an expected source unit. Thus, if the user is expecting data from a specific source the signal UA is false. If the unit attempting to communicate with a given unit is other than the one from which the given unit is expecting data, DIDEQ1 is true while DIDEQ is false. Thus, OR 584 produces a high level output signal that passes through OR 575 to set the NAK 1 flip-flop. As in the case previously described, the output of NAK 1 passes through OR 579 to generate the NAK signal on the M-Bus, and passes through OR-AND 581 to set NAK 2.

The NAK 2 flip-flop may be set by any NAK signal appearing on the M-Bus, or more specifically on bidirectional lead 511. When NAK 2 is reset it enables one input to OR-AND 581. The NAK signal from the bus enables the second input of OR-AND 581 and its output sets NAK 2.

The acknowledge signal from the main bus is applied through bus connection 585 to one input of an OR-AND 586 having an output connected to the data input of the ACK flip-flop. When the flip-flop is reset its output enables a second input of OR-AND 586. Thus, every time an ACK signal appears on the bus it sets the ACK flip-flop in all units.

The DATA OUT RECEIVED (DOR) flip-flop has its data input connected to the bus through a bus connection 587. Hence any DATA OUT signal appearing on lead 513 of the bus sets the DOR FF in all MBIPs.

The DATA OUT PAUSE (DOP) flip-flop is set by a signal on lead 527. In FIG. 5C, an OR 588 receives the signals H ACK FF, H NAK FF and PAK RES. If either the ACK or NAK flip-flop in an MBIP is set or the user generates a PAK RES signal, OR 588 produces a signal to set the DOP flip-flop. The output of OR 588 is also applied to FIG. 4 as the EDO RES signal for resetting the EDO flip-flop 407.

The DOS flip-flop has its data input connected to the output of an OR 589. This OR produces an output to the DOS flip-flop when the ACK flip-flop is reset provided the DOP flip-flop is not active. The DOP flip-flop is active only when a user device desires to delay the transmission of data on the M-Bus. A user having data ready for transmission on the M-Bus within 40 nanoseconds after the leading edge of SBR can generate the signal DATA READY (DR). In FIG. 5C, DR passes through an OR 590 and an OR 591, provided EDO is true, to produce a signal which is applied to the data input of the DOP flip-flip. When DOP is activated, it blocks or 539 for one clock cycle thus preventing the setting of the DOS flip-flop for one cycle. This in turn delays the resetting of the bus request flip-flop 554, as subsequently described.

Control flip-flop 571 is set by a signal on lead 530. In FIG. 5C, an OR 593 receives the signal UA from the user and produces an output signal that is applied to one input of an OR 594. OR 594 also receives the signal L DIDEQ1. Thus, any time the destination ID on the bus is equal to the wired ID of a unit, and the user device of the unit is producing the UA signal, OR 594 produces an output signal which passes through an OR 595 to set the flip-flop 571. Flip-flio 571 is also set when an expected identification and a destination ID are both equal to the wired ID of a unit, provided the user device is producing the signal READY FOR BUS DATA (RFBD). Under these conditions the output of OR 583 enables one input of an OR 596 which is further enabled by L EIDEQ and L DIDEQ1. The resulting output from OR 596 is applied through OR 595 to the data input of flip-flop 571.

Flip-flop 572 has its data input connected to the output of an OR 597. IF the flip-flop 572 is reset, the DOR flip-flop is set, and flip-flop 571 is set, OR 597 produces the signal ENABLE DATA IN (EDI). This signal sets flip-flop 572 and sends an indication to the user device that it should accept the data on the M-Bus.

An OR 598 has inputs connected to the DOR flip-flop and flip-flops 571 and 572. If the DOR flip-flop and flip-flop 571 are set and flip-flop 572 is reset all inputs to OR 598 are at the low level and it produces a high level output signal which is passed through bus connection 585 onto bidirectional lead 512 as the ACK signal.

In order for an MBIP to place a DATA OUT signal on the M-Bus, the output of an OR 599 must be at the high level. OR 599 has inputs connected to the ACK flip-flop, the DOP flip-flop and the output of an OR 549. OR 549 has inputs connected to the NAK 2 flip-flop, OR-AND 581 and OR-AND 586. If there is no ACK or NAK signal on the M-Bus and the NAK 2 flip-flop is reset, the output of OR 549 is at the low level. If the ACK flip-flop is also reset and the DOP flip-flop is set OR 599 produces a signal which passes by way of bus connection 587 to the Data Out line 513.

The control generator circuits of FIG. 5C produce the signal RESET REQUEST on lead 524 to reset the Request flip-flop 554. An OR 540 is connected to the outputs of the NAK 2 and the DO SENT flip-flops. When both flip-flops are set, the high level output from OR 540 passes through an OR 541 and is applied to the reset input of the Request flip-flop 554. OR 541 also produces an output signal to reset the Request flip-flop when the PAK RES signal is generated by the user device.

An OR 542 produces an output through OR 541 to reset the request flip-flop when the DOS flip-flop and the ACK flip-flop are set provided the user device is not generating the signal BURST MODE (BURST). The BURST signal allows a source unit to transfer data across the M-Bus at a maximum rate without releasing the bus to other units. The signal BURST is activated at the same time as the SBR signal and is terminated after the (N−1)th transfer, that is, at the trailing edge of DATA TRANSFER ACCEPTED (DTA). The DTA signal is generated by an OR 543 when both the DO SENT and ACK flip-flops are set.

The circuits of FIG. 5C also include an OR 544 which generates the signal SERVICE REQUIRED (SVCR) on lead 515. This is an optional feature provided for use where the user device in a unit is a slow input/output controller which is expecting bus data but cannot load the bus data with the relatively short EDI signal generated in FIG. 5B. The signal SVCR can be utilized to set a flip-flop (not shown) in the user device to load the bus data and set a ready for bus data flip-flop to result in a load signal of two clock periods. The signal EXPECTING BUS DATA (EBD) is applied through an OR 545 to one input of OR 544. The RFBD signal passes uninverted through OR 583 to a second input of OR 544 and must be false. OR 544 is further enabled when the DOR flip-flop is set and EIDEQ and DIDEQ1 are both true.

M-BUS PROTOCOL HYBRID

FIG. 6 shows the logic of an MPRT 207. The purpose of the MPRT is to handle the transmission and receipt of byte 1 information between a unit and the M-Bus. Byte 1 data from the M-Bus is received into the MPRT through bus connection 610. When a unit is in the receive mode, that is, when it is a destination unit, it receives byte 1 information having the format shown in FIG. 1C. From bus connection 610 the parity bit and bits 5, 6 and 7 are applied over a lead 612 to a set of AND gates 614. In order to inform the user as to where the data is coming from, the GRANT ID produced by the priority controller when the source unit is granted priority is buffered in the destination MBIP and applied over bus 404 to five of the ANDs 614 of the destination unit. If the destination user device is willing to accept input data from the bus, the signal DIRECTION (DIR) is false thus enabling the ANDs 614. The outputs from ANDs 614 then pass through nine ORs 616 and bus connections 618 from whence they pass over bidirectional bus 209 to the byte 1 storage facilities of the interface 203. From the interface, the byte 1 data may then pass to the user device along with bytes 0 and 2-6 from the M-Bus.

The MPRT continuously monitors byte 1 of the M-Bus and continuously applies to the MBIP an indication of the destination identification code and lock bit (FIG. 1A) present on the bus. The destination ID and lock bit are applied from the bus connections 610 over leads 620 to a set of ORs 622. From ORs 622 the destination ID (now BDID 0-4) is applied to the MBIP circuit shown in FIG. 4. The lock bit from one OR 622 is applied over lead 606 to the MBIP circuits of FIG. 3.

The MPRT includes a 5-bit register 624 the stages of which are connected to bus connectors 618. The register 624 may at various times store either an expected source identification or an expected destination identification. The outputs from Register 624 are applied over leads 602 to the MBIP circuits of FIG. 4 and over leads 604 to the MBIP circuits of FIG. 3. If desired, the ESID may be obtained by connecting leads 602 to the outputs five of nine ORs 628 which, as described below, place the destination ID on the M-Bus when the MBIP generates EDO.

When acting as a source or transmitter the MPRT may operate in either one of two modes depending upon whether a signal produced by the user is either high or low. This signal, called MODE SELECT (MSA), selects transmit format 1 when it is high and selects transmit format 2 when it is low. When transmit format 1 is selected the MPRT places on the M-Bus byte 1 data having the format shown in FIG. 1A. When format 2 is selected the MPRT places on the M-Bus byte 1 data having the format shown in FIG. 1B.

Bus connections 618 are connected directly to inputs of nine ANDs 626 having their outputs connected to nine ORs 628. The outputs of the ORs 628 are connected to nine ANDs 630 which are in turn connected to the M-Bus through bus connections 610. When MSA is true, the byte 1 data from the user device, or more particularly from interface 203, passes through ANDs 626 and ORs 628 to ANDs 630. When the MBIP generates the signal ENABLE DATA OUT, ANDs 630 are enabled and the byte 1 data passes onto the bus through connections 610.

From connections 618 bits 5, 6 and 7 are applied to a parity generator 632 which generates the parity of the three bits. The generated parity and bits 5, 6 and 7 are then applied to four ORs 634. Four ORs 636 are enabled during format 2 transmissions to gate the four bits through ANDs 638 to four of the ORs 628. The other five ORs 628 derive their inputs during format 2 transmissions from five ANDs 640. The outputs from register 624 are applied to five ORs 642 and the signal L MSA enables five ORs 644 during format 2 transmissions. Thus, data having the format shown in FIG. 1B appears at the outputs of ORs 628 during format 2 transmissions. This data is gated through ANDs 630 to the M-Bus when the MBIP generates the ENABLE DATA OUT signal.

The outputs of ORs 628 are also applied to a set of ANDs 646 which are connected through ORs 616 to Bus Connections 618. This permits byte 1 information being placed on the M-Bus to be returned to the user over bus 209 and interface 203.

It should be noted that register 624 may be loaded with a destination ID directly from bus connections 618 when the signal DIN goes low. The register 624 thus contains the expected destination ID which is used to sample the lock register and determine whether the expected destination is available to receive the data which it is desired to transmit. On the other hand, when a unit is operating as a destination unit it is desirable to store the GRANT ID produced by the priority controller in the register. This GRANT ID can then be utilized by the unit as a destination ID for responding to the unit which sent it the data. The user device drives the signals DIN and DIR to the low level so that the GRANT ID, after being buffered in the MBIP, is passed over bus 404, through ANDs 614, ORs 616, and bus connections 618 to the register 624.

While the MPRT is illustrated separately, it may in fact be included in a programmable interface unit like that disclosed in the concurrently filed application of Branigin et al. Ser. No. 140,268, entitled Programmable Interface Unit.

PRIORITY CONTROLLER

Figure 7:
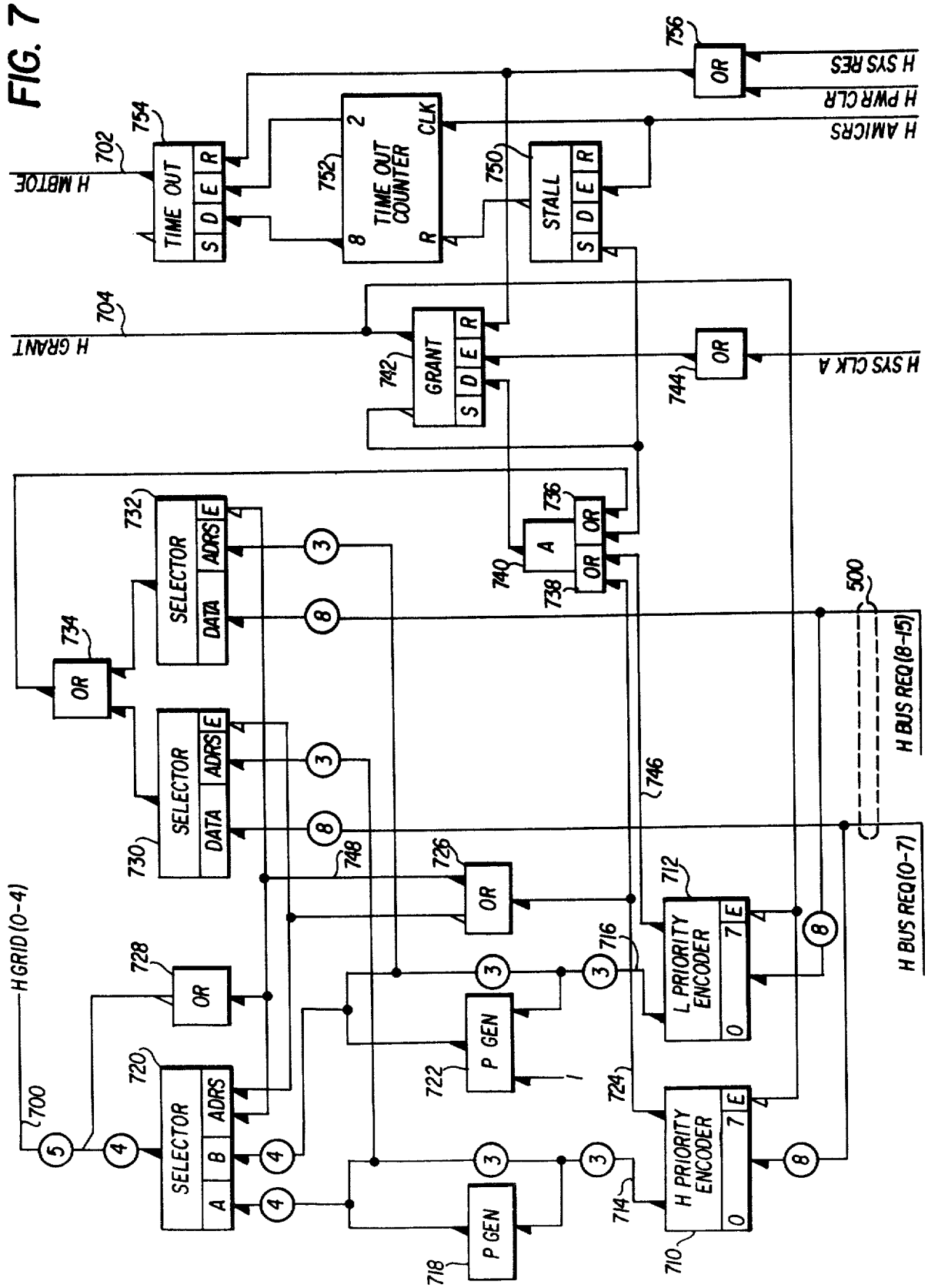
FIG. 7 illustrates a preferred form of the priority controller shown in FIG. 1.

FIG. 7 shows a suitable priority controller which may be utilized as the M-Bus Priority Controller 100. The priority encoder includes a high priority encoder 710 which receives the bus requests from units 0-7 and a low priority encoder 612 which receives the bus requests from units 8-15, assuming of course that there are 16 units connected to the bus. According to the convention employed unit 0 has the highest priority and unit 15 has the lowest priority. Encoder 710 generates on output leads 714 a 3-bit code representing the number of the highest priority unit, of units 0-7, having a bus request signal on the bus 500. In like manner, encoder 712 generates on leads 716 the three low order bits of a 4-bit code representing the number of the highest priority unit, of units 8–15, making a bus request over the bus 500.

The 3-bit output of encoder 710 is applied to a parity generator 718 and the 3-bits and generated parity are applied to one set of inputs of a selector 720. In like manner, the 3-bit code on leads 716 is applied to a parity generator 722 together with a 1-bit and the resulting parity bit is applied with the bits on leads 716 to a second set of inputs of selector 720.

The high priority encoder 710 produces an output signal on a lead 724 if the encoder receives a bus request signal at any of its inputs. A signal on lead 724 is passed through an OR 726 to an addressing input of selector 720. In this case the output signal from OR 726 selects the A inputs so that the output of priority encoder 710 is passed through selector 720 to become the grant identification signals GID (0–4). If there is no signal on lead 724, the output of OR 726 addresses selector 720 to select the B inputs so that the output of priority encoder 712 appears on bus 700 as GID (0–4). In this latter case, the low level signal on lead 724 passes through OR 726 and an OR 728 to place a 1-bit in the high order position GID 1.

The bus request signals on bus 500 are applied to two selectors 730 and 732. The 3-bit output code from encoder 710 is applied as an addressing input to selector 730 while the output code from encoder 712 is applied to the addressing inputs of selector 732. One or the other of the selectors 730 and 732 is enabled by the output of OR 726 depending upon whether a bus request signal is being applied to the high priority encoder 710.

Assume for example that bus requests are being generated by units 5 and 7. Unit 5 is of the highest priority hence encoder 710 produces a 3-bit code on leads 714 and generates a signal on lead 724. The signal on lead 724 is applied to an OR 738 to enable one input of AND 740. If the grant flip-flop 742 is reset its output passes through an OR 736 to enable a second input of AND 740. The output of AND 740 is applied to the data input of the grant flip-flop so that upon occurrence of the next SYSTEM CLOCK. An output from an OR 744 sets the grant flip-flop thus generating the signal GRANT on lead 704.

The encoder 710 generates on leads 714 a binary indication of unit 5 (101). This indication, together with the parity generated at 718, is passed through selector 720 to become GID (0, 2–4). GID 1 is a zero because the signal on lead 724 passes through OR 726 and is inverted at OR 728 to become the GID 1 signal.

The grant flip-flop must remain active as long as unit 5 keeps its bus request active. The 3-bit output from encoder 710 addresses selector 730 so that the bus request 5 signal on bus 500 is passed through the selector. The output of selector 730 passes through an OR 734 to the OR 736 thus keeping AND 740 enabled. This prevents the grant flip-flop from being reset until unit 5 terminates its bus request.

The OR 738 receives a signal over a lead 746 from encoder 712. The signal on lead 746 is generated if any of the inputs to encoder 712 is active. It acts with the output of the grant flip-flop to set the grant flip-flop if the highest priority request is a request coming from one of the units 8–15. The selector 732 functions in the same manner as selector 730 except that is produces an output signal through OR 734 only if the highest priority unit requesting access to the bus is one of the units 8–15. In this case the lead 724 will be at the low level so that the output 748 from OR 726 will be at the low level to enable the selector 732.

FIG. 7 also shows a Stall flip-flop 750, a Time Out Counter 752 and a Time Out flip-flop 754. These circuits control the generation of the signal MBTOE which is applied over the M-Bus to reset the control flip-flops 561 in the MBIPs of all units. The control flip-flops then remain reset until the BTOE indication is cleared by a package reset. The controlling user device performs the required system action when it receives the signal BTOE from the MBIP over lead 521.

The Stall Counter is set when the grant flip-flop is set. It is enabled by the signal AMICRS which is a one megacycle signal derived from the system clocks. When the stall flip-flop is set it resets the Time Out Counter 752 which then begins to count each of the signals AMICRS. If the time out counter reaches a count of 10 before the Grant and Stall flip-flops are reset, it produces output signals to the data and enable inputs of the Time Out flip-flop 754 thus producing MBTOE.

Both the Grant flip-flop and the Time Out flip-flop may be reset by the output of an OR 756 upon occurrence of either of the signals POWER CLEAR or SYSTEM RES derived from circuits not forming part of the present invention.

ALTERNATIVE EMBODIMENT

FIG. 6A illustrates a modification of the MPRT 207 shown in FIG. 6. In this modification, the register 624 is replaced with a counter-register 624' having low order and parity bit stages which may be toggled by the output of an AND 650. The counter-register 624' is loaded in the same manner and under the same conditions as the register 624 previously described. The AND 650 receives the signals LOCK 1 ACTIVE, REQ FF, and SYSTEM CLK A. Thus, the low-order and parity bit stages of the counter-register 624' may be toggled by the output of AND 650 in a source unit when the user within the unit wishes to communicate with a destination unit but the lock bit for the destination unit is set.

The advantage of this arrangement is best illustrated by considering FIG. 9 wherein a plurality of Main Storage Units (MSU) are connected in parallel to a storage or S-BUS and one or more Central Processors (CPU) and I/O units are connected to an M BUS with two or more Main Storage Processors (MSP) connected in parallel between the two busses. As a typical operation, the CPU might wish to communicate with an MSU. The CPU would contend for priority on the M-BUS and when granted access might place on the M-BUS a word wherein byte 1 contains the destination ID having the value one (00010). The function code in byte 0 of the word placed on the M-BUS might tell the MSP that it should retrieve data from main storage. The MSP would contend for priority on the S-BUS, and when granted priority, would obtain the data. When it has the data available, the MSP would then contend for priority on the M-BUS, and when granted priority, would place a word on the M-BUS having in byte 1 the destination ID of the CPU which would then accept the data from the M-BUS.

In the above example, if the MSP having the destination ID of "1" were busy, then its lock bit in the lock registers of all units on the M-BUS would be set. In the central processing unit, the Set Bus Request flip-flop 554 is set when the unit wishes to establish a dialogue and, when the EDID is applied to selector 323 in the MBIP of the CPU, it finds the lock bit for the MSP having the destination ID set. These conditions enable the AND 650 in FIG. 6A and upon occurrence of the next clock pulse the parity bit and low-order bit of the counter-register 624' are toggled. In effect, this changes the EDID from 00010 to 00001 which is the destination ID for the MSP whose DID is 0. An attempt is then made to communicate with this MSP in the normal manner. Thus, if the CPU wishes to communicate with an MSU through MSP 1 and the MSP is busy, the CPU then seeks to establish communication with the MSU through MSP 0.

When the CPU is attempting to communicate with, for example, one of the IO units on the M BUS, it is normally not desirable to permit the CPU to communicate with one I/O unit if the other is busy. Other similar conditions might exist. Thus, the value in counter-register 624' must be evaluated to produce a signal on lead 652 to enable AND 650 only if the alternate mode of communication is permissable. In the above example where the two MSP's may be utilized alternately by the CPU, and the MSP's have the destination identifications 00001 and 00010, bits 0, 1, and 2 of the counter-register 624' should be checked for all zeroes and the enabling signal on lead 652 produced only if this condition exists. If bits 0, 1 and 2 are all zeros, the DID could not possibly be that of one of the I/O controllers whose DIDs are 01011 and 01101.

While a specific preferred embodiment of the invention has been described in detail, it will be understood that various deletions, substitutions, and modifications may be made in the disclosed embodiment without departing from the spirit and scope of the invention as defined by the appended claims.

The embodiments of the invention in which an exclusive property or privilege is claimed are defined by the following:

1. In a bus control system having a plurality of units connected to a common bus, each unit including means for producing a bus request signal and an expected destination code identifying a unit as an expected destination unit when it desires to communicate with another unit connected to said common bus, said system further incuding a priority controller responsive to bus request signals generated by said units for generating a grant identification for identifying one of said units as a source unit having access to said common bus, said grant identification being applied to all said units, the improvement comprising:

a lock register in each of said units, each of said lock registers having a plurality of stages, each of the stages corresponding to one of said units;

means in each of said units for selectively setting corresponding stages in said lock registers when the unit corresponding to said stages is unavailable for communication and selectively resetting corresponding stages in said lock register when the unit corresponding to said stages is available for communication;

means in each said unit responsive to an expected destination code generated in said unit and to the lock register in said unit for inhibiting the means in said unit for producing a bus request signal;

whereby a unit does not produce a bus request signal when the expected destination unit with which it desires to communicate is unavailable for communication with it, said means for selectively setting and resetting the stages of said lock registers comprising:

first means in each said unit for generating a code representing the identity of said unit;

second means in each said unit for comparing the generated code for the unit with the grant identification produced by said priority controller and producing an enable data out signal for gating data from the unit to said common bus, the unit in which said enable data out signal is produced being designated a source unit;

the data produced by said source unit including a lock bit and a destination identification code identifying one of said units as a destination unit, said data being applied over said common bus to all said units connected thereto;

third means in each of said units for comparing said generated code with said destination identification code and generating an acknowledge signal upon an equal comparison, said acknowledge signal being applied over said bus to all said units; and, fourth means in each of said units responsive to said acknowledge signal, said grant identification, said destination identification code and said lock bit for selectively setting and resetting the stages of said lock register corresponding to said source unit and said destination unit.

2. The improvement as claimed in claim 1 and further comprising means for inhibiting the operation of said fourth means in said source unit and said destination unit whereby the stages of the lock registers that correspond to said source unit and said destination unit are set or reset by said fourth means in all units except said source unit and said destination unit.

3. The improvement as claimed in claim 2 wherein each of said units comprises a user device and an associated bus interface means, said user devices each including means for producing said lock bit and said expected destination code; and, said bus interface means each including said lock register and said first, second, third and fourth means.

4. The improvement as claimed in claim 3 wherein the user device in at least one of said units performs functions different from the functions performed by other of said user devices.

5. The improvement as claimed in claim 3 wherein each of said units includes means for placing a negative acknowledge signal on said common bus if the means comparing the generated code and the destination code produces a signal and the unit is unable to accept data from said common bus;

the user devices in at least two of said units being alike and a third unit including means for modifying said destination identification code whereby said third unit, when it is acting as a source unit, may communicate with a second of said two units if the first of said two units is not available.

6. The improvement as claimed in claim 1, 2, 3, 4 or 5 wherein a first communication between a source unit and a destination unit is subsequently followed by a second communication in which the former source unit is the destination unit and the former destination unit is the source unit, said common bus being available for use by other units during the interval between said first and second communications.

7. The improvement as claimed in claim 1 or claim 2 wherein said fourth means includes means for setting said stages corresponding to said source unit and said destination unit if said lock bit is active and resetting said stages corresponding to said source unit and said destination unit if said lock bit is inactive.

* * * * *